June 17, 1930.  J. W. FOERCH, JR  1,764,253
BAKING PAN
Original Filed Feb. 10, 1926
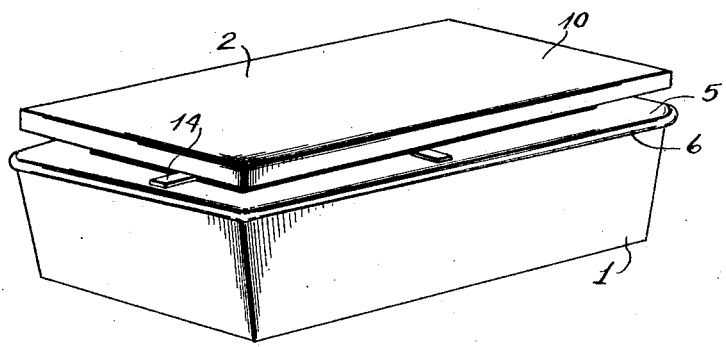
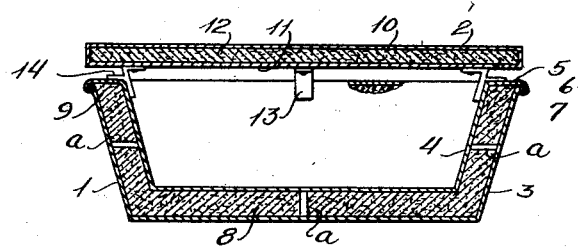
INVENTOR.
John W. Foerch, Jr.,
BY
ATTORNEYS.

Patented June 17, 1930

1,764,253

UNITED STATES PATENT OFFICE

JOHN W. FOERCH, JR., OF WILKES-BARRE, PENNSYLVANIA

BAKING PAN

Refiled for abandoned application Serial No. 87,265, filed February 10, 1926. This application filed February 21, 1930. Serial No. 430,330.

This invention relates to baking pans, and more particularly to pans used for baking bread, cake, and the like.

This application is a refiling of application Serial Number 87,265, filed February 10, 1926.

The primary object of the invention is to provide a pan in which it will be practically impossible, with the exercise of much less care than is usually used in cooking or baking, to burn the contents of the pan, either on the top, sides, or bottom, or to bake the contents too hard, but which will enable the contents to be uniformly cooked throughout.

Ordinary pans used for baking are usually made of various grades, or thicknesses of tin, and great care must be exercised in regulating the oven heat to prevent burning, and even then, due to many varying and uncontrollable conditions and circumstances, food is burned with consequent loss, and often the loaf is so charred on the sides, bottom, and top, as to necessitate scraping off the burned portions or "char" before the loaf is fit for use. On the other hand, with the use of ordinary baking pans, the "char" or crust formed by burning may be to some extent, an advantage, in that it forms a protection for the inside of the loaf in the baking process, so that the inside of the contents of the pan may be fairly well cooked without further burning. However, it is obvious that it is not desirable to form this crust or "char" on the loaf, but it is desirable to cook the contents in a uniform manner throughout, so that the cake or bread, as the case may be, will have practically the same appearance throughout its entire surface, and at the same time be thoroughly cooked through.

Those familiar with domestic problems involving cooking and baking, know well the care that must be exercised in cooking bread or cake, especially food of this character that "rises" in the pan in the process of cooking. In an oven too hot (and heat is difficult to regulate, especially in coal and wood burning stoves) the outer surface of the contents of the pan, including the top, will harden so quickly that satisfactory expansion is prevented, and the fact of cooking too quickly on the surface locks up the moisture in the loaf, causing the product to be soggy and uncooked on the inside, although sufficiently cooked on the outside.

With the use of the utensil about to be described, which comprises a pan and a cover, cake or bread, or the like, may be perfectly cooked throughout without danger of burning or charring, on either bottom, sides, or top, allowing in the cooking process the gradual escape of moisture, which by the novel arrangement and combination of the pan and cover, is dried instantly upon its escape from the contents, and under no conditions passes back or is drained from the cover to the contents, the cover at the same time being so positioned relative to the pan, as to prevent the too-quick cooking or burning of the contents on the top.

To the ends above intimated, the invention contemplates the provision of a pan having inner and outer walls, uniformly spaced apart and extending throughout the bottom of the pan, and entirely to its upper edges, the space between the walls being filled with a "filler" of fire-proof material, and the provision of a top, also provided with walls spaced apart and filled with a "filler" of fire-proof material, like that in the bottom of the pan, and means for properly and uniformly spacing the cover from the top of the pan.

Referring to the drawings:

Figure 1 is a perspective view of the pan as a whole, constructed in accordance with my invention.

Figure 2 is a cross section, there being shown in this view a section of the cover in proper relation to the pan.

Referring to the drawings, the numeral 1 designates the pan proper, and 2 a cover therefor. The numeral 3 designates the outer shell of the pan, and 4 the inner shell. The inner shell is provided with a continuous laterally extending flange 5, whose outer edge 6 is spun or crimped into locking engagement with the upper edge 7 of the inner shell. These shells as shown are uniformly spaced apart, that is to say, the space between the side walls of each shell, and the bottoms of each shell is uniform, and the "filler" 8 of fire-proof material, such as asbestos, extends entirely to the upper edge of the pan as indicated at 9, so as to insure uniform baking of the loaf, on the sides, from the bottom to the top.

The cover 2 is virtually formed by two spaced plates 10 and 11, between which there is a filler 12 of the same character as that between the walls of the pan.

At the sides and ends of the cover 1 rivet legs 13, which extend a short distance down into the pan, and each leg is provided with a lateral extension 14, adapted to over-lie the flat upper edge of the pan, to properly space the cover from the pan, so that in the cooking operation the contents are protected from the direct oven heat, while permitting a moisture from said contents to escape, which moisture as intimated in the statement of the object of the invention, is immediately dried by contact with the hot cover, and thus under no conditions is drained back upon the article being cooked.

It has been found by experiment that the use of the pan described makes certain and uniformly successful, a baking operation that has heretofore been tedious and uncertain, and eliminates the necessity of frequently changing the position of the pan in the oven, which constant moving and inspection, characterizes baking operation in pans of ordinary construction.

It is well known that the burning or charring of a cake or bread, and other things cooked in like manner, destroys the flavor of the product, but that a uniform baking without burning such as is accomplished with the pan above described, preserves the flavor.

It has been suggested in the foregoing, that the formation of a char or crust when baking with the ordinary pan may in a measure, protect the loaf so that the inside thereof will be fairly well cooked. In the pan above described, the "filler" between the walls of the pan, extends this protection, thus enabling the loaf to be properly cooked without any part thereof being burned or scorched.

In ordinary cooking it is common to resort to the use of paper around the loaf to prevent burning. With the pan above described it has been found that the use of paper is entirely unnecessary.

I preferably provide between the inner and outer walls of the pan a number of pins $a$, to keep the walls uniformly spaced apart, and these also serve to strengthen the whole structure.

Claims:

1. A baking pan comprising a body formed with inner and outer walls uniformly spaced apart the space between the walls being filled with a filler of fireproof material, and an imperforate cover having a flat under surface, said cover being provided with means adapted to engage the upper edge of the pan body to keep said cover uniformly spaced from said body entirely around the top thereof, thereby providing means for preventing the moisture from reaching the contents of the pan and at the same time providing means for preventing the burning of said contents.

2. A baking pan comprising a body formed with inner and outer walls uniformly spaced apart and a filler of fireproof material between said walls, an imperforate cover formed with walls spaced apart and having between them a filler of fireproof material, said cover having a flat under surface and provided with legs on the under side thereof and spacing the cover from the pan body uniformly around the top of said body, the space thus produced preventing moisture of the contents of the pan from reaching the said contents and at the same time, preventing the burning of said contents.

In testimony whereof I affix my signature.

JOHN W. FOERCH, Jr.